April 8, 1969   H. H. GEHMAN ET AL   3,436,901
CUTTING MACHINE FOR STALK CROPS
Filed Oct. 15, 1965
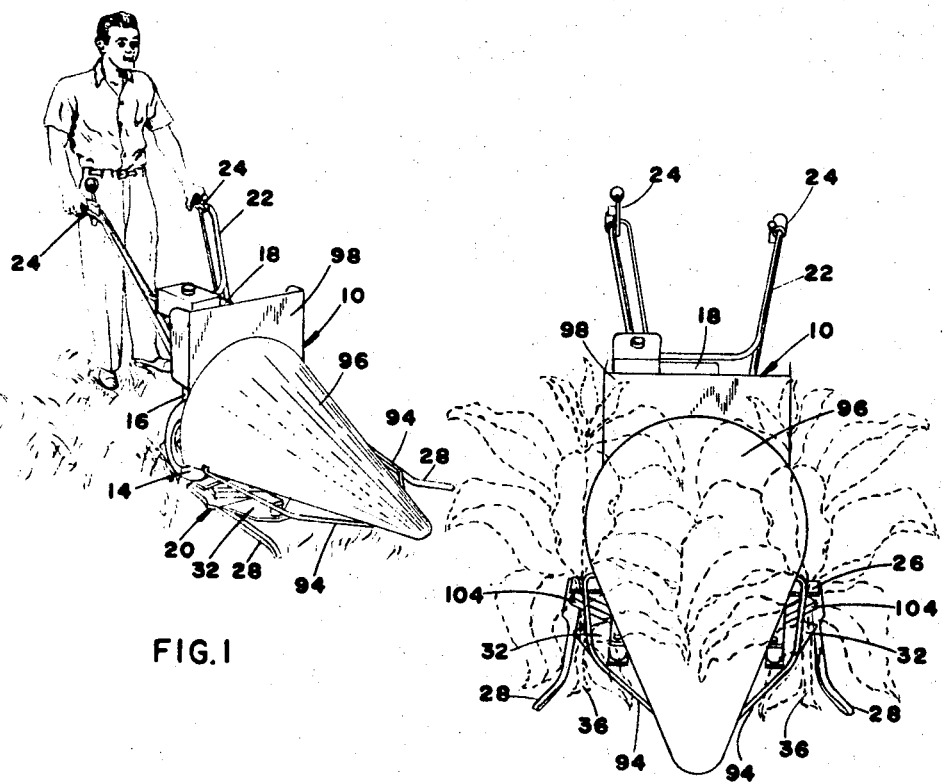
FIG.1
FIG. 2
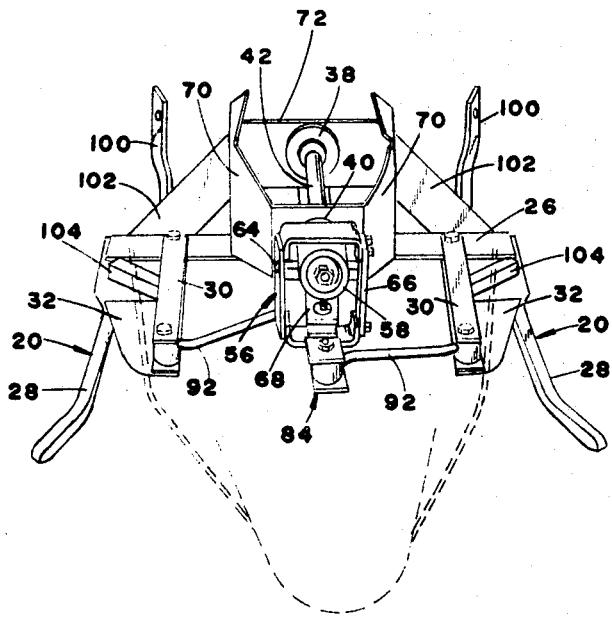
FIG.3
INVENTOR.
HARVEY H. GEHMAN
BY ROLAND P. GEHMAN
ATTORNEY April 8, 1969  H. H. GEHMAN ET AL  3,436,901
CUTTING MACHINE FOR STALK CROPS Filed Oct. 15, 1965

INVENTOR.
HARVEY H. GEHMAN
BY ROLAND P. GEHMAN

ATTORNEY

United States Patent Office 3,436,901
Patented Apr. 8, 1969

3,436,901
CUTTING MACHINE FOR STALK CROPS
Harvey H. Gehman, R.D. 1, Reinholds, Pa. 17569, and Roland P. Gehman, R.D. 1, Stevens, Pa. 17578
Filed Oct. 15, 1965, Ser. No. 496,449
Int. Cl. A01d *35/20, 55/02, 45/16*
U.S. Cl. 56—26.5                                    7 Claims

ABSTRACT OF THE DISCLOSURE

A cutting machine for stalk crops arranged to cut two parallel rows thereof simultaneously and provided with a pair of similar stationary blades arranged at opposite sides of the machine and spaced apart substantially equal to the distance between a pair of rows of stalk crops, a pair of blade supports extending substantially longitudinally of the direction of movement of the machine and pivotally connected at the rear ends thereof to a frame which commonly supports said stationary blades, similar shear blades fixed respectively to said blade supports for movement therewith toward and from said stationary blades and having shearing edges extending respectively at an acute angle to one of said stationary blades and arranged for shearing coaction therewith, power means caried by said frame, and driving means interconnected to said power means and said blade supports forwardly of the pivots thereof and operable to oscillate said shearing blades simultaneously in scissors-like coaction toward and from said stationary blades to counterbalance the movement of said blade supports and shearing blades while simultaneously shearing the stalks in a pair of rows thereof.

---

This invention pertains to a machine for cutting stalk crops, preferably a single row thereof, and more particularly, it is adapted for cutting stalk crops such as tobacco which, at present, very largely are cut by hand. The cutting of stalk crops such as tobacco, by hand, especially where the crops preferably should be cut very close to the ground, is a very tiring and "backbreaking" type of job requiring substantially constant stooping and bending while hacking the stalks with a knife by hand.

Certain types of harvesting machines have been developed heretofore, some of these being specifically designed for the harvesting of stalk crops such as tobacco and the like. In general however, these have been of the type utilizing rotary cutters, which require rather complex and involved types of driving means, while other previously designed machines have utilized a sickle bar type of cutter mechanism. This latter type is somewhat inefficient for cutting single rows of crops and, further, particularly where the crops are to be cut close to the ground, a transversely extending sickle bar type of cutter places a drag upon the ground in the direction of movement of the harvester which requires a certain amount of force to overcome.

It is the principal object of the present invention to provide a preferably power driven cutting machine which operates preferably upon a shearing or clipping type of principle for severing stalk crops preferably adjacent the ground, whereby a machine of this type is especially adapted for the harvesting of tobacco but it is to be understood that other types of stalk crops may be harvested such as corn and the like, especially where such crops are planted in rows.

It is another object of the invention to provide simple but highly effective cutter structure of the shearing type and employing a blade fixedly carried by the frame of the harvester as it moves parallel to a row of crops to be cut, and an oscillating blade support having a shearing blade thereon coacting with the stationary blade, the oscillation preferably occurring at a relatively high rate, such as of the order of 1,000 oscillations per minute but it is to be understood that this exemplary rate of cutting operation is not to be regarded as restrictive.

It is a further object of the invention to provide a cutting machine for stalk crops in which cutting apparatus is disposed at opposite sides of said machine, whereby the machine may operate with equal facility to cut a row of crops either at the left-hand side or right-hand side of the machine as it advances along a row of such crops.

Ancillary to the foregoing objects it is still another object to operate the movable cutting members of the cutting assemblies respectively at opposite sides of the machine in such manner that the movable cutters oscillate simultaneously toward and from each other, respectively into shearing enegagement with the stationary blades of said assemblies, thereby counter-balancing each other, even though only one cutter assembly is being used at any one time, thereby minimizing vibration resulting from the operation of the machine.

Still another object of the invention is to provide power means substantially centrally of the machine and driving mechanism is provided which actuates an oscillating or rocking drive bar to the opposite ends of which connecting rods are pivotally connected, the opposite ends of the connecting rods being connected pivotally peferably to the movable cutter arms adjacent the outer ends thereof, thereby permitting the use of the driving power to highest efficiency in causing oscillation of the movable blades with respect to stationary blades of each blade assembly.

There is a still further object of the invention which provides appropriate shield means for the power unit and drive mechanism, the shield means simultaneously serving as guide means to assure the laying of the cut stalks in an even manner in a row as the machine traverses a field being harvested, whereby the cut stalks readily are picked up with minimum damage to the crops such as tobacco leaves.

Still another object of the invention is to concentrate the primary weight of the machine comprising the power unit and transmission drive mechanism for the wheels which support the machine slightly rearward of the axis of rotation of the wheels, while the cutter mechanism and a portion of the drive means therefor extends forwardly of the axis of the wheel means, whereby the center of gravity of the entire machine is preferably located substantially adjacent the axis of the wheel means, thereby facilitating guiding of the machine by means of handles extending rearwardly therefrom for manipulation by a walking operator, as well as permitting ready positioning of the cutter assemblies adjacent the ground and maintaining the same in such operative position with minimum ease by the operator.

Details of the foregoing objects and of the invention, as well as other objects thereof, are set forth in the following specification and illustrated in the accompanying drawings comprising a part thereof.

In the drawings:

FIG. 1 is a perspective front view of a cutting machine embodying the principles of the present invention and illustrating the same in the manner in which it is moved over a field to be harvested by a walking operator.

FIG. 2 is a slightly perspective front view of the cutting machine shown in FIG. 1 and illustrating, in phantom, rows of stalk-type crops selectively engageable by the cutter assemblies respectively positioned at opposite sides of the machine.

FIG. 3 is a front perspective view of the cutter assemblies and drive mechanism therefor removed from the power means and the main frame of the machine shown in FIGS. 1 and 2.

Figure 4:
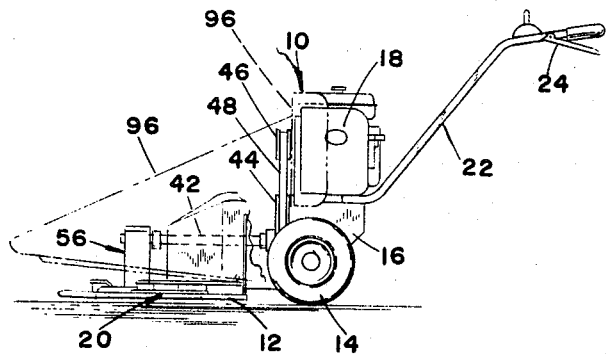
FIG. 4 is a side elevation of the cutter machine shown in FIGS. 1 and 2, the protecting and guide shroud being illustrated in phantom while the remainder of the machine is illustrated in full lines.
Figure 5:
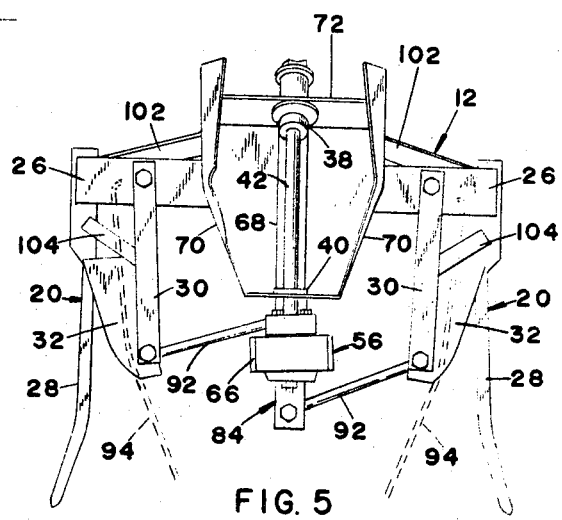
FIG. 5 is a top plan view showing details of the cutter assembly and drive mechanism therefor per se, said mechanism being similar to that shown in perspective manner in FIG. 3.
Figure 6:
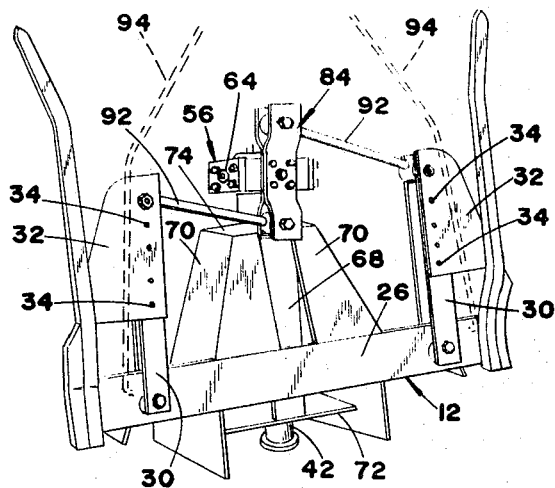
FIG. 6 is a perspective bottom view of the mechanism shown otherwise in FIGS. 3 and 5 and illustrating particularly the oscillating bar of the driving mechanism to which the connecting rods for the movable cutters are connected.

Referring particularly to FIGS. 1, 2 and 4, the cutting machine 10 which embodies the principles of the present invention and which is designed primarily to successively cut stalk-type crops arranged in a row, such as tobacco, corn and the like, comprises a frame 12, the principal elements of which are best shown in FIGS. 3, 5 and 6. The machine also preferably is primarily supported by wheel means 14 which, preferably, comprise a pair of similar traction-type wheels arranged respectively on opposite sides of a transmission housing 16, shown in FIG. 4, above which is mounted a self-contained power means 18, such as a gasoline engine of suitable horsepower.

As also will be seen from FIG. 4 in particular, the frame 12, which supports cutting assemblies 20, at opposite sides thereof, extends forwardly from the axis of the wheel means 14, while the principal weight of the machine comprises the transmission housing 16 and its contents as well as power means 18, both of which are located slightly rearward of the axis of the wheel means 14, whereby the center of gravity of the entire cutting machine is substantially directly over the axis of the wheel means 14.

In its preferred construction, the cutting machine 10 is intended to be manipulated by an operator while walking behind the machine. For this purpose, the machine is provided with rearwardly extending handle means 22 upon the outer ends of which control mechanism 24 is mounted, the same being for purposes of determining the speed at which the power means 18 drives the machine through the medium of the wheels 14, as well as actuating a conventional clutch, not shown, by which the transmission 16 is connected to the wheels 14. Further, by having the handle means 22 extend rearwardly, suitable leverage is provided by which the forward, cutting end of the machine may be pivoted about the axis of the wheel means 14 and thereby determine the height at which the cutting assemblies 20 will shear stalk crops above the ground. Preferably however, the machine is so designed that, particularly in regard to harvesting tobacco stalks, the cutting thereof may be accomplished very close to the ground, as is desired.

Referring to FIGS. 3, 5 and 6, one of the principal elements of the frame 12 is a transversely extending bar 26 which comprises the principal supporting means for the cutting assemblies 20. A pair of such cutting assemblies 20 preferably are provided, respectively supported adjacent opposite ends of bar 26, for several reasons. One is that the machine may be operated to cut a row of stalk crops regardless of whether said row is at the right side or left side of the machine. Also, if row crops happen to be planted uniformly even widths apart, and assuming that such spaces between successive rows are substantially equal to the transverse spacing between the cutting assemblies 20, two rows may be cut simultaneously by the machine. An even more important reason for providing two cutting assemblies at opposite sides of the machine however resides in the fact that the movable cutters preferably are moved simultaneously outward, away from each other during the shearing stroke, and then are retracted toward each other, simultaneously, thus providing a counter-balancing effect which substantially completely eliminates any vibration during operation of the machine.

The cutting assemblies 20 each comprise outermost elongated blades 28 which, as can be seen in plan view in FIG. 5, are almost parallel with each other but the outer ends thereof flare outwardly away from each other. Said blades extend longitudinally of the machine substantially in the direction of movement thereof during operation. The rearward ends of the blades 28 are secured to the outer ends of transverse bar 26 by any suitable means such as welding or the like. Thus, said blades 28 are referred to as fixed blades in that they are fixed with respect to the machine though they move therewith during the operation of the machine along a row of crops to be cut.

The blades 28 also serve another function in that they are lowermost at the forward end portion of the machine and thus serve as guide skids, slidably engaging the ground if it is desired to cut the stalks substantially at ground level. For that purpose, the blades 28 preferably are formed from hardened steel and, if substantial wear resistance is desired, strips or successive spot-like weldments of metal which is very highly resistant to abrasion may be affixed thereto, especially along the lower surfaces thereof.

Extending forwardly from the transverse bar 26 is a pair of blade supports 30 which may be suitably formed from a pair of strips of steel which are vertically spaced apart, as best shown in FIG. 6, the rear ends thereof being respectively above and below the transverse bar 26, said bar preferably having rubber-mounted bearings therein which oscillatably support the rearward ends of the blade supports 30. Such bearings preferably have a sufficient vertical dimension as to prevent any appreciable twisting or skewing of the support bars 30 during operation thereof in a manner described hereinafter.

The blade supports 30 are arranged for the connection of movable blades 32 thereto. Any simple means such as bolts 34 may be used to detachably connect the blades to the supports 30 whereby the blades readily may be removed for sharpening or replacement, when required. Further, it will be seen that the blades 32 preferably are mounted adjacent the lower surface of the lowermost metal bar of the composite blade supports 30 and the lower surfaces of such blades preferably slidably coact with the upper surfaces of the stationary elongated blades 28 so as to coact in shearing relationship therewith. However, it is more essential that the stationary blades 28 act as guide and stop members which slide with respect to the stalks 36 of the exemplary agricultural plants or crops shown in phantom in FIG. 2 for example, whereby when the blades 32 are oscillated as is to be described, the sharpened outer edges of the blades 32 are moved in cutting manner against the stalk while the stalk is held against lateral movement by engagement of the opposite side of the stalk by the elongated blades 28 from that side which is being cut by the sharpened edges of the blades 32. Hence, even though after a period of use, there may not be very effective shearing relationship between the stationary blades 28 and movable blades 32, effective cutting of crop's stalks nevertheless is accomplished by the machine in view of the holding effect afforded by the stationary blades 28 while the blades 32 move with respect thereto into and through the stalks of crops such as tobacco, corn and the like.

Extending forwardly from the transmission housing 16 and rotatably supported within suitable bearings 38 and 40, as shown in FIGS. 3 and 5, is a substantially horizontal drive shaft 42 to the rear end of which a large pulley 44 is connected. The drive shaft of the power means 18 has a smaller pulley 46 connected to the forward end thereof, see FIG. 4, and a flexible belt 48 extends around these pulleys to transmit power from means 18 to the shaft 42.

Figure 7:
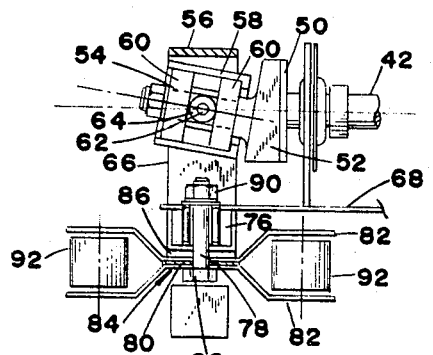
FIG. 7 is an enlarged vertical sectional view showing details of the wobble joint drive by which rotary motion of the drive shaft is converted to oscillatory motion of the rocking drive bar.

Oscillation of the movable blades 32 and their supports 30 is effected by the following mechanism. Said mechanism is shown in certain details in FIGS. 3 and 5 but full details thereof are best illustrated in FIG. 7, to which attention now is directed. Fixed to the forward end of drive shaft 42 is a flange 50 to which is connected a head 52 having a short shaft 54 projecting perpendicularly from the forward face thereof and comprising part of a wobble joint drive mechanism 56. The front and rear faces of head 52 are disposed at an acute angle to each other and the shaft 54 is so located with respect to drive shaft 42 that the median point of the effective length thereof is disposed upon the axis of drive shaft 42 as can be seen from FIG. 7.

Surrounding shaft 54 and coaxial therewith, is a sleeve 58. A pair of anti-friction bearings 60 are mounted upon shaft 54 and the outer races thereof are fixed suitably relative to sleeve 58. Projecting diametrically in opposite directions from the opposite sides of sleeve 58 are a pair of trunnions 62. Said trunnions project through bearings 64 respectively disposed in the opposite vertical wall of a rectangular drive frame 66 which extends substantially vertically and is mounted for oscillatory movement about a vertical axis. Vertical movement of the frame 66 is prevented by the following mechanism.

An elongated supporting plate or bar 68 extends longitudinally of the frame 12, parallel to and above the level of the movable blades 32. Such bar is shown in FIGS. 5 and 6 as well as in FIG. 7 and it will be seen that the frame also includes forwardly extending bracing plates 70 which also extend vertically upward from transverse bar 26. A transverse plate 72, see FIGS. 5 and 6, extends between the bracing plates 70 adjacent the rearward ends thereof and another transverse plate 74 extends therebetween adjacent the forward end of the plate 70. Supporting bar 68 is fixed to the lower edges of the transverse plates 72 and 74 and the forward end thereof projects into the rectangular drive frame 66 for purposes of supporting an anti-friction bearing boss 76 containing suitable bearings within which a short shaft 78 is mounted for oscillation. Said shaft extends through the lower transverse plate 80 and also through the intermediate portions of a pair of complementary but inverted and irregularly shaped plates 82 which comprise a composite rocking drive bar 84. A suitable clamping plate 86 engages one end of the inner race of the anti-friction bearing within the boss 76, whereby it will be seen that the shaft 78 may comprise a heavy-duty bolt, the head 88 thereof clampingly engaging the outermost irregular plate 82 to secure the same in fixed relationship against the lower transverse plate 80 of drive frame 66 which, in turn, is clamped against the mid-portion of the upper irregular plate 82 which abuts clamping plate 86, so that when the nut 90 is tightened against the upper end of the iner race of said anti-friction bearing and boss, 76, drive frame 66 and composite rocking drive bar 84 will oscillate as a unit about the axis of the shaft or bolt 78.

From FIG. 7, it also will be seen that the outer ends of the irregular plates 82 are spaced vertically apart sufficient to receive therebetween the bearings formed in one end of connecting rods 92. The opposite ends of the connecting rods also have been pivotally connected to the blade supports 30 preferably adjacent the forward ends thereof as is readily seen especially from FIGS. 3, 5 and 6. Preferably, the bearings in the opposite ends of the connecting rods also are of the rubber-mounted type so as to resist abrasion from dust and grit which the same may encounter during use of the machine, thereby extending the life of the machine as much as possible.

From the foregoing, it will be seen that when the drive shaft 42 is revolved, the wobble-joint drive mechanism 56 will cause the rocking drive bar 84 to oscillate and thereby simultaneously move the movable cutters 32 outwardly in cutting or shearing relationship with respect to crop stalks and the stationary blades 28, outward movement of the stalks away from the outwardly moving blades 32 being prevented by engagement of the stalks with the stationary blades 28 as described above. During one-half revolution of the shaft 42, the blades 32 will be moved outwardly in cutting or shearing direction, while during the other half of each revolution of the drive shaft 42, the movable blades 32 will be retracted toward each other. Such similar simultaneous movement of both of the movable blades 32 results in counter-balancing each other, even though only a single row of crops may be cut at any one time, whereby vibration which otherwise might result from operation of the machine is substantially eliminated while, at the same time, the provision of a pair of cutting assemblies 20 respectively at opposite sides of the machine enables the same to be operated adjacent either the left hand or right hand side of a row of crops which it is desired to harvest. Such a provision eliminates the need for back-tracking or "dead-heading" in one direction of the length of a field while cutting only in the opposite direction as is necessary with only a single cutting assembly provided along one side of the machine. Thus, provision of two cutting assemblies is not an aggregation; rather, said assemblies cooperate with each other and thus comprise a useful combination.

Additional refinements are also embodied in the present invention, especially for purposes of guiding the stalks into engagement with the movable cutters as well as holding cut stalks from being carried by the movable cutter during the retracting movements thereof. One such refinement comprises a pair of bar-like forwardly extending guide members 94 which are best shown in FIGS. 1 and 2 in full lines and also in phantom in FIGS. 3, 5 and 6. These are provided adjacent opposite sides of the machine and it will be seen that the rearward portions thereof preferably overlie the movable cutters 32 and the inward movement of said cutters in retracting direction is inward from said bars, whereby said bars will positively detach any cut stalks from the movable blades in the event there is a tendency for the stalks to cling to the blades after being cut.

The guide members 94 may be supported by any suitable means but the preferred support comprises a combined protecting and guide shield or shroud 96 which, in cross-section, is somewhat semicircular and tapers from a relatively large diameter at the rear, forwardly to substantially a point. Said shroud completely covers the sides and top of the driving mechanism which is driven by the power means 18. As can be seen especially from the side elevation of FIG. 4, in which the shroud 96 is illustrated in phantom, the rear end of said shroud also encloses the driving pulleys and belts 48, said rear end of the shroud preferably abutting a vertical shield 98, which may be formed from suitable sheet metal for example and is immediately in front of the power means 18 so as to protect the same and also prevent falling stalks which have been cut from contacting the power means or the driving mechanism operated thereby. The guide members 94 may be attached, at the opposite ends thereof, respectively to the lower edges of the opposite sides of the shroud 96 by any suitable means such as welding or the like.

The shroud 96 may be supported by any suitable means such as vertical brackets 100 which may comprise metal strips fixed at the lower ends thereof to angular bracing plates 102 which at the opposite ends thereof respectively may be secured by welding or the like to the transverse bar 26 and the rear edges of bracing plates 70 as shown in FIG. 3.

After crop stalks have been cut by the movable blades 32, to prevent the lower cut ends thereof, for example, from dropping behind the rear edges of the movable blades 32, such as when the blades are being retracted, outwardly and rearwardly extending shunting members 104 are fixed at the inner ends thereof to the blade supports 30 so as to be movable therewith. The outer ends of the shunting members 104 preferably at least partially overlie the rearward portions of the elongated blades 28 and thereby insure the camming of the cut lower ends of cut stalks laterally outward from whichever side of the machine is being used to cut a row of crop stalks. As the tops of the cut stalks tend to fall rearwardly as a result of the tendency of the lower ends of the cut stalks to be moved forwardly by the advancing machine until said cut lower ends clear the machine entirely, such tops tend to at least partially engage the shroud 96 while falling. Due to the fact that the rear sides of the shroud 96 extend laterally sufficiently to completely clear all rearward portions of the machine, such shroud will effectively guide the falling stalks into an even row upon the ground as the machine moves forwardly, whereby such row of neatly arranged fallen stalks may be subsequently gathered by additional workers. In the event they are tobacco stalks, said stalks are speared upon a suitable pointed lath, or similar supporting means, and are hung for drying in such condition.

While the present invention primarily has been designed for use as a cuting machine of a harvesting type intended to be directed by a walking operator following behind the same, especially while cutting possibly only a single row of stalk crops, or at most, two rows of stalk crops, it is to be understood that the actual cutting knife arrangement included in the cutting assemblies 20, as well as the drive or operating means therefor, may be incorporated in harvesting machines of other types in which, for example, the cut products likewise may be additionally handled or processed in some manner in accordance with the additional mechanism which may be embodied in the machine, such as a corn harvester or silage cutter, wherein the cut stalks are moved by suitable conveying and processing equipment after being cut from the root portion which remains in the ground.

From the foregoing, it will be seen that the present invention provides a relatively simple yet highly effective and fool-proof cutting machine for stalk crops which may be employed to cut along either left or right hand sides of a row of crops to be harvested, a pair of cutting assemblies respectively being provided along opposite sides of the machine for such purpose and incident to the operation of said assembly simultaneously, counterbalancing of the movable cutters is provided, thereby either substantially reducing or practically eliminating vibration in the machine resulting from operation of the movable cutters. The machine is power-operated and preferably is so balanced with respect to its supporting wheels that it easily may be guided by an operator walking behind the machine and the center of gravity of the machine with respect to the axis of the wheeled support is such that the operator readily may determine the height of the cutter mechanism above the ground.

While the invention has been described and illustrated in its several preferred embodiments, it should be understood that the invention is not to be limited to the precise details herein illustrated and described since the same may be carried out in other ways falling within the scope of the invention.

We claim:
1. A cutting machine for harvesting stalk-type crops comprising in combination, a frame supported for movement along a path between a pair of parallel rows of stalks adjacent the ground, a pair of elongated blades fixed stationarily to said frame and spaced transversely apart a distance approximately equal to the distance between said pair of rows of stalks and said blades extending substantially in the direction of movement of said machine, a pair of blade supports extending substantially longitudinally of the direction of movement of said machine when operating, pivot means pivotally connecting the rear ends of said blade supports to said frame, similar shearing blades fixed respectively to said blade supports for movement therewith toward and from one of said elongated blades and each shearing blade having a shearing edge extending respectively at an acute angle to one of said elongated blades and arranged to shearingly coact therewith, power means carried by said frame, and driving means supported between said pair of shearing blades and interconnected to said power means and to said blade supports forwardly of said pivots thereof and operable to oscillate said shearing blades simultaneously in scissors-like coaction toward and from said elongated blades to counterbalance the movement of said blade supports and shearing blades carried thereby while simultaneously shearing the stalks in a pair of rows thereof.

2. The cutting machine according to claim 1 further including a shunting member fixed to each blade support adjacent the rearward end of said movable blade and extending outwardly and rearwardly therefrom to guide cut stalks away from the rearward end of said movable blades.

3. The cutting machine according to claim 1 in which said movable blades coact with the inner edges of said stationary blades and said driving means being connected to said movable blade supports in a similar manner so as simultaneously to actuate said movable blades in both outward shearing movement and retracting movement toward each other, thereby to effect said counterbalance of said movable blades and supports therefor and minimize vibration of said machine.

4. The cutting machine according to claim 1 in which said power means includes a rotatable drive shaft extending longitudinally of said frame, said machine also including a wobble driving joint connected to said shaft for operation thereby and said driving means including a rocking bar oscillated by said wobble driving joint and connecting rods connected pivotally between opposite ends of said rocking bar and said movable blade supports, thereby to actuate said blades simultaneously as aforesaid.

5. The cutting machine according to claim 4 further including a rearwardly flared shroud extending rearwardly from the forward end of said machine and covering the top and sides of said power means and driving means, thereby to protect the same and guide cut stalks rearwardly and outwardly away from said machine as the same advances.

6. The cutting machine according to claim 5 further including guide means extending longitudinally along the opposite sides of said shroud in acute angular relationship to said elongated blades and adjacent said movable blades, said guide means being operable to guide stalks to be cut into engagement with said movable blades.

7. The cutting machine according to claim 1 in which said frame includes a substantially straight bar extending transversely to the axis of the machine rearwardly of said cutters, the rear ends of the elongated blades being fixed thereto for support thereby and the rear ends of the movable blade supports being pivotally connected thereto by bearing means having sufficient vertical length to afford bracing of said movable blades against twisting about a horizontal axis.

References Cited
UNITED STATES PATENTS

| | | | |
|---|---|---|---|
| 1,055,023 | 3/1913 | De Leon | 56—27.5 |
| 1,744,368 | 1/1930 | Derfler | 30—328 |
| 2,718,059 | 9/1955 | Koschak. | |
| 2,793,486 | 5/1957 | Dietrich | 56—27.5 |

ABRAHAM G. STONE, *Primary Examiner.*

P. A. RAZZANO, *Assistant Examiner.*

U.S. Cl. X.R.

30—247; 27.5; 56—246